March 12, 1957
G. BADALINI
2,784,554
VARIABLE SPEED ROTARY PUMP AND
MOTOR HYDRAULIC TRANSMISSION
Filed Nov. 21, 1952
3 Sheets-Sheet 1
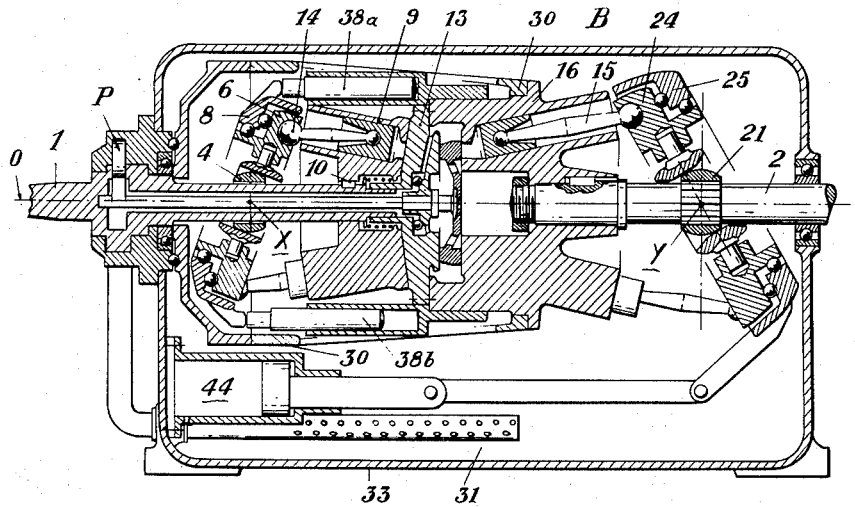
Fig. 1
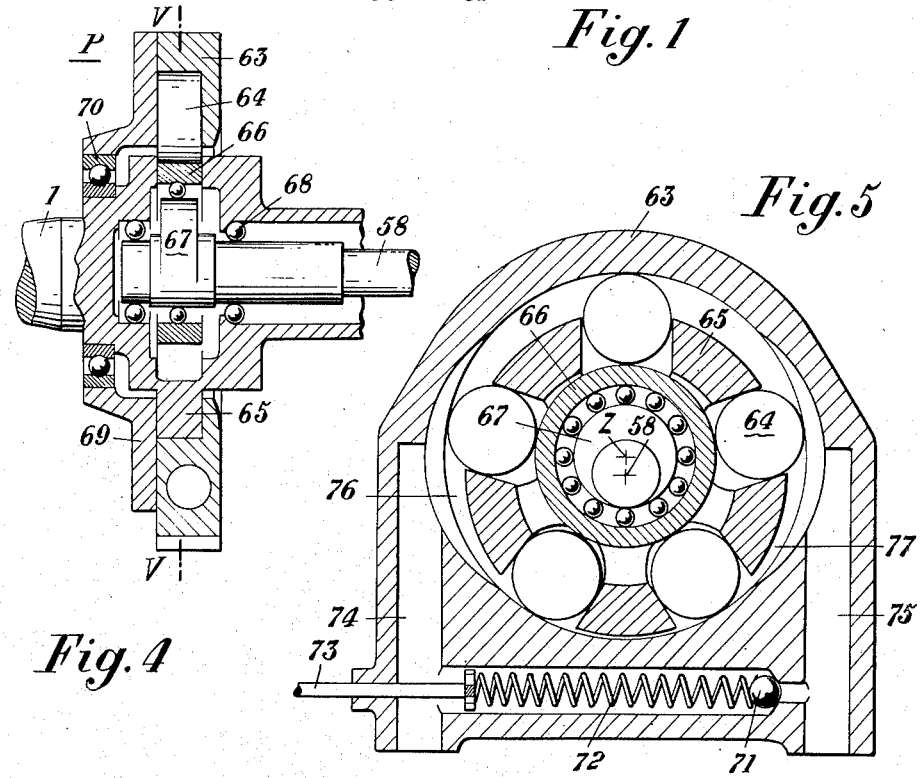
Fig. 4
Fig. 5
INVENTOR.
GIOVANNI BADALINI
BY
Young, Emery & Thompson
ATTYS.

500
United States Patent Office 2,784,554
Patented Mar. 12, 1957

2,784,554

VARIABLE SPEED ROTARY PUMP AND MOTOR HYDRAULIC TRANSMISSION

Giovanni Badalini, Milan, Italy, assignor to S. p. A. Cambi Idraulici Badalini, Rome, Italy Application November 21, 1952, Serial No. 321,905

Claims priority, application Italy November 22, 1951

6 Claims. (Cl. 60—53)

The invention relates to a continuously variable speed transmission apparatus particularly suitable to be used in motor vehicles and is concerned with an apparatus of the kind constituted by a multipiston hydraulic pump and a multipiston hydraulic motor, connected to each other in a closed circuit, and wherein the pistons, both of the motor and of the pump, are arranged along coaxial solids of revolutions, the pump being mounted on a driving shaft and the motor unit on a driven shaft.

According to the present invention an apparatus of this kind is characterized in that it comprises a distributor ring for the motor unit having an axis eccentrically disposed with respect to the axis of the driving and driven shaft, said distributor ring being mounted on a shaft coaxial with respect to the driving and driven shaft and stationary with respect to the housing of the apparatus, said distributor ring being mounted on the stationary shaft in such a manner as to be capable of sliding in a plane perpendicular to the said stationary shaft, whereby said distributor ring is adapted to be brought into a position with its axis in alignment with the axis of the driving and driven shaft.

The accompanying drawings diagrammatically illustrate an embodiment of the apparatus according to the invention.

Fig. 1 is a longitudinal section of the apparatus.

Fig. 4 is an axial section of a suction pump for the fluid leaking from the transmission and collecting in the housing of the apparatus, such pump being used where the stationary shaft does not extend beyond the driving shaft.

Fig. 5 is a section taken on the line V—V of Fig. 4.

Figure 6:
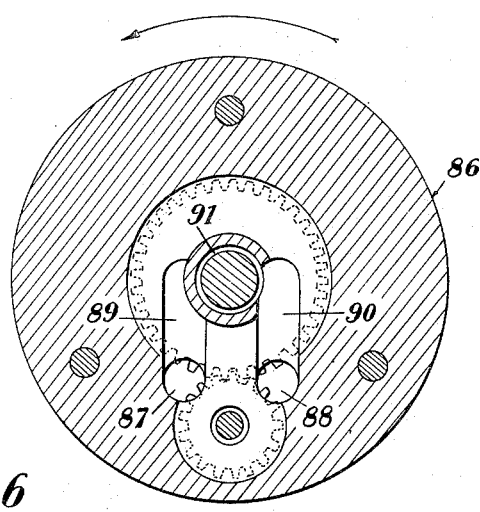
Fig. 6 is a cross section of another embodiment of the suction pump taken on the line VI—VI of Fig. 7.

As will be seen from the drawings, the hydraulic power transmission apparatus of Fig. 1 comprises a driving shaft 1, a driven shaft 2, a pump unit A and a motor unit B. Pump unit A comprises a cylinder block 9 keyed at 10 on the driving shaft 1. Motor unit B comprises a cylinder block 16 keyed on the driven shaft 2 and having its axis in alignment with the axis of the pump cylinder block 9.

The axis of the cylinders of the cylinder blocks 9 and 16 are disposed along the generatrices of two coaxial converging cones having the vertices facing each other.

The free ends of the piston rods 14 of the pump unit abut against a wobble ring 6 which, by means of a universal joint 4 is keyed on the shaft 1. Similarly, the free ends of the piston rods 15 of the motor unit B bear on a wobble ring 24 which is mounted on the driven shaft 2 by means of a universal joint 21.

The pump unit A and the motor unit B are hydraulically connected to each other in a closed circuit through the distributor member or distributor 13, as will be explained in detail hereinafter.

The wobble ring 6 is mounted for rotation by means of ball or roller bearings on the backing plate 8 which is pivoted on the housing 30 of the pump unit and may oscillate about the axis X. The inclination of the backing plate 8 may be adjusted by means of two opposite pistons 38a and 38b which receive liquid under pressure from the circuit of pump A, through ports and ducts existing in the distributor 13, which are not illustrated in the drawings. This is possible since pistons 38a and 38b rotate together with the distributor 13 and the housing 30. The device which controls wobble plate 8 will not be described in greater detail since it does not form a part of the invention.

The pump cylinder block 9 abuts against the distributor 13 which is fastened to the housing 30 of the pump unit 16 and the motor unit B is also fastened to housing 30. The housing 30, the distributor 13 and the motor cylinder block 16 are rotatable with the driven shaft 2. This latter is connected by means of the universal joint 21 to the wobble ring 24 which is reciprocated by the piston rods 15 and which is mounted for rotation by means of ball or roller bearings on the backing plate 25. Plate 25 is pivoted on the outer stationary housing 33 and can oscillate about the axis Y under the action of a piston 44, the operation of which will not be described in greater detail. Between the distributor 13 and the cylinder block 16 of the motor a chamber C (see Fig. 2) is provided wherein a distributor ring 53 is mounted which divides chamber C into two portions, namely an inner cylindrical portion $C_1$ and an outer annular portion $C_2$. On the distributor 13 two ports are provided, namely an output port $L_m$ which communicates through the duct $D_2$ with the outer annular portion $C_2$ of the chamber C and suction port $L_a$ which communicates through the duct $D_1$ with the inner cylindrical zone $C_1$ of the chamber C.

Figure 2:
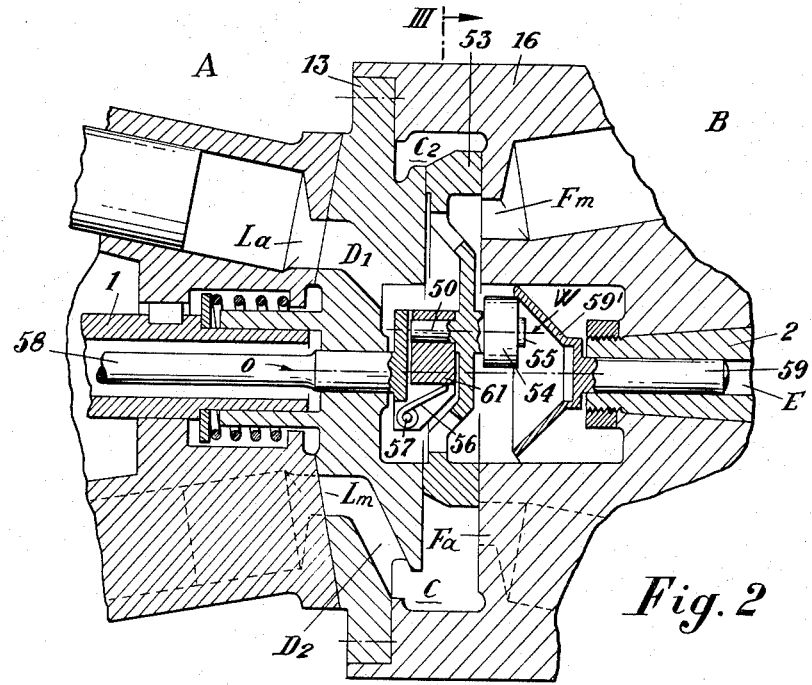
Fig. 2 is a longitudinal section on an enlarged scale of the central portion of the apparatus.

Each cylinder of the cylinder block of the motor is provided with a port, the two ports appearing in Fig. 2 being designated $F_m$ and $F_a$.

The ring 53 is rotatable about the axis W which lies parallel to and spaced from the axis of the driving and driven shafts. The ring 53 is slidably mounted on the spindle 58 disposed inside the driving shaft 1, the spindle 58 being stationary with respect to the outer housing of the transmission apparatus.

Figure 3:
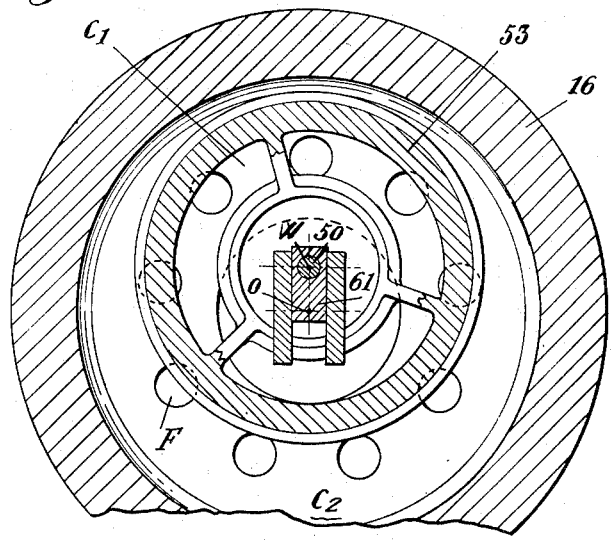
Fig. 3 is a cross section taken on the line III—III of Fig. 2.

Owing to the eccentric position of the axis W of ring 53 (see Fig. 3) the outlet port $F_m$ of the cylinder of the motor shown in Fig. 2 is in communication with the inner cylindrical portion $C_1$ of chamber C, which in turn is in communication with the suction port $L_a$ in the pump A, while the suction port $F_a$ of the motor cylinder shown in Fig. 2 is in communication with the outer annular zone $C_2$ of the chamber C.

If the axis W of the ring 53 is displaced to coincide with the axis of the driving and driven shafts, the communication between ports $F_a$ and $F_m$ of the motor cylinders and the outer annular portion $C_2$ of the chamber C is interrupted and said ports are brought into communication with the inner zone $C_1$. This is possible due to the fact that the inner diameter of ring 53 is greater than the diameter of the circle tangent to the inner wall of ports $F_a$ and $F_m$.

To permit the shifting of the ring 53, the latter is provided with a pivot 50 which is carried by a slider 61 which may slide in the guide 56 formed at the end of spindle 58. Slider 61 is biased by spring 57 so that the ring 53 is normally kept in its eccentric position. Opposite to the pivot 50, ring 53 is provided with a pin 55 carrying a freely rotatable roller 54. The end of the driven shaft 2 is provided with a chamber E having therein a piston 59 provided at its outer end with a funnel shaped extension 59' which abuts against the outer surface of the roller 55. The piston 59 may be displaced longitudinally under the pressure exerted by an amount of oil which may be introduced in the chamber E, in a preferred manner not shown on the drawing. When the piston 59 moves under said pressure, extension 59' pushes against roller 54, thus bringing ring 53 in the position concentric with the driving and driven shafts.

The pump P (Fig. 1) has the function of sucking from the reservoir 31 of the housing 33 the oil that leaks through the apparatus and to return it again under slight pressure in the suction circuit of the pump unit A.

As previously stated, the shaft 58 is normally kept stationary with respect to the outer housing of the apparatus. To accomplish this, the end of the shaft 58 may pass out of the shaft 1, or may terminate inside the shaft 1. In the first case the shaft 58 would be fastened to an outer flange of the apparatus. In the second case, the shaft 58 is kept stationary by coaction with the pump P. This latter arrangement will be described in greater detail in Figs. 4, 5 and 6, 7 wherein there are illustrated two different embodiments of pump P. In the embodiment illustrated in Figs. 4, 5 the pump P comprises a casing 63 wherein there may freely roll the rollers 64 which are arranged in a plurality of grooves made at the periphery of the rotor 65 which is fastened to the driving shaft 1. During the rotation of the rotor 65, the rollers 64 effect the pumping of the oil since on one side the volume of chamber 76 increases, thus bringing about a suction, and on the other side the volume of chamber 77 decreases thus pumping the liquid. The chamber 76 communicates through duct 74 with the reservoir 31 and the chamber 77 communicates through the duct 75 with the suction circuit of the pump A.

Rollers 64 are kept adjacent to the inner surface of casing 63 by ring 66, whereon they abut. Rollers 64 are entrained by rotor 65 when the latter rotates together with the driving shaft 1, with which it is integral. Shaft 1 during rotation is supported at one side by shaft 58 through balls 68 and at the other side by the ball bearing 70 arranged in the cover 69 of the casing 63. Owing to the arrangement of the various members and to the eccentricity of shaft 58 with respect to the cam 67, shaft 58 cannot rotate.

On the pump P there is also provided a ball valve 71 urged by a spring 72 which is adjustable by means of a rod 73 in order to control the working pressure of the pump P.

Figure 7:
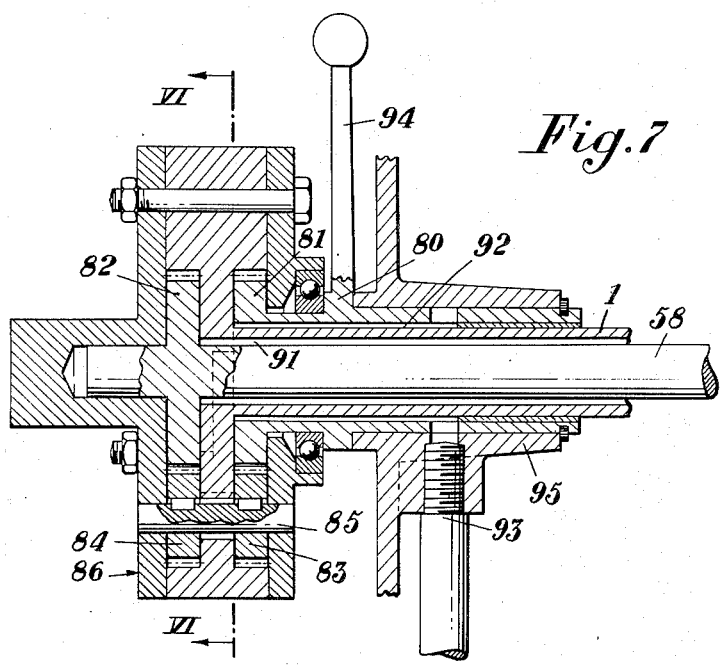
Fig. 7 is the axial section of the embodiment of the suction pump of Fig. 6.

Another embodiment of the pump such as P is shown in Figures 6 and 7, wherein the shaft 58 carries at one end a gear 82 and on the driving shaft 1 a sleeve 80 is mounted which carries at one end a gear 81 having the same pitch diameter as that of the gear 82. Two pinions 83 and 84 keyed on the shaft 85 mesh with gears 81 and 82. The shaft 85 is mounted on the housing 86 fastened to the driving shaft 1. When the housing 86 rotates together with the driving shaft 1, if the sleeve 80 and gear 81 therewith are kept stationary, the gear 82 and the shaft 58 will also remain stationary. Under these conditions each pair of gears 81—83 and 82—84 acts as a gear pump which upon rotating in the direction shown by the arrow in Fig. 6 sucks the oil from the port 87 and supplies the oil to the port 88. These ports respectively communicate by means of ducts 89 and 90 with the annular chambers 92 and 91 so that the inside of shaft 1 communicates with the output of the pump P and the pipe 93 with the suction side of pump P. By actuating lever 94 it is possible to cause any desired angular displacement of the sleeve 80 with respect to the stationary support 95 and the shaft 58. Since the shaft 58 carries at one end the pivot 50 whereon ring 53 is mounted, it is possible through small angular displacements of shaft 58 to always keep ring 53 in a correct position, thus adjusting the timing of the distribution.

When the shaft 58 is rotated through 180° the output port and the suction port are inverted with respect to each other so that the reverse motion takes place.

The operation of the apparatus is as follows, it being assumed that the backing plates 8 and 25 are inclined as shown in Figure 1. When shaft 1 rotates, a certain amount of oil (Fig. 2) passes through the port $L_a$ from the pump A, the duct $D_1$, the central chamber $C_1$ and the port $F_m$ and acts on the suction pistons of the motor cylinders and causes the rotation of the motor cylinder block 16, of the driven shaft 2, and of the housing 30 of the pump unit A.

Owing to the rotation of the casing 30, the volumetric displacement of the pump is not proportional to the number of rotations per minute of the driving shaft, but to the difference between the R. P. M. of the shaft 1 and the R. P. M. of the rotating housing 30, such speed being the speed that the motor unit B and hence the driven shaft 2 can reach under the particular inclination assumed by the backing plates 8 and 25.

In the case in which the R. P. M. of the driving shaft 1 is constant, the R. P. M. of the driven shaft 2 depends solely on the inclination of the backing plates, i. e., of the ratio of the volumetric displacements of the motor B and the pump A. When the volumetric displacement of the pump is reduced to zero the apparatus will be in a neutral position, while, when the volumetric displacement of the motor is reduced to zero the transmission ratio will be 1–1 and the driving shaft and the driven shaft rotate at equal speed. Of course, in the intermediate positions the height of inclination of the backing plate 25 of the motor unit is increased and the inclination of the backing plate 8 of the pump unit is reduced in direct proportion to the increase in the transmission ratio.

By reducing the inclination of the backing plate 8 of the pump A or by increasing the inclination of the backing plate 25 of the motor B, the ratio of the two volumetric displacements will increase and therefore also the transmission ratio will increase. The specific value of the volumetric displacements will only affect the torque transmission, the pressure being equal.

The torque available on the driven shaft 2 is the reaction torque available on the housing 30 of the pump A and it is equal to the torque transmitted to the pump A through the driving shaft 1, plus the torque transmitted by the motor B to the universal joint 21 when the transmission ratio is different from the ratio 1:1.

The last mentioned torque will be developed by the motor owing to the difference of revolutions between the cylinder block 9 and the housing 30 of the pump, i. e. between the driving shaft 1 and the driven shaft 2.

When the backing plate 25 is perpendicular to the shaft 2 the apparatus is in the position corresponding to the transmission ratio of 1:1, i. e., with a maximum displacement of the pump and a zero displacement of the motor since the wobble ring 24 may rotate with respect to the backing plate 25. The pump cylinder body rotates together with the housing 30 and the thrusts of the pump pistons are received by the ball bearings of wobble ring 6 and backing plate 8, which are stationary since the wobble ring 6 rotates together with the backing plate 8. Under such conditions the pistons of the motor B are subject to the pressure of the compressing circuit of the pump, which pressure has an appreciable value and which is transmitted through the piston rods 15 to the ball bearing which are interposed between the wobble ring 24 and the back plate 25. There is therefore a great overload upon the last mentioned ball bearings. Moreover, between the cylinders and the pistons of the motor unavoidable liquid leak may take place.

To avoid such inconveniences which are particularly dangerous when the apparatus is applied to a motor vehicle, ring 53 is moved to bring its axis W to coincide with the axis of the driving and driven shaft. Under these conditions ring 53 interposes between the pump and the motor and closes the passage between the annular portion $C_2$ of chamber C and all the ports $F_a$ and $F_m$ of the motor, thus preventing the oil under pressure from passing from the pump to the motor. The pistons of the motor are therefore unloaded. It is, however, advisable that when the axis of ring 53 coincides with the axis of the driving and driven shafts a communication remains between all the motor cylinders on the side where no pressure exists, so that, in the event the backing plate 25 is not exactly perpendicular to the driven shaft, there may be a slight reciprocation of the motor pistons, and the liquid may freely pass from the pistons moving in one direction to the pistons moving in the opposite direction, thus avoiding eventual dangerous over-pressure in the motor cylinders. This is obtained by making, as already stated, the inner diameter of ring 53 greater than the diameter of the circle tangent to the inner wall of ports $F_a$ and $F_m$.

The displacement of ring 53 as described above is to be carried out when the backing plate 25 is substantially perpendicular to the shaft 2 so as to avoid a sudden passage to the direct drive.

What I claim is:

1. A variable speed transmission of the hydraulic type, particularly suitable for automotive devices, comprising a driving shaft, a driven shaft, and a third shaft coaxial with the preceding ones and stationary, a hydraulic pump and motor of the piston type, including pistons and piston connecting rods, hydraulically interconnected in a closed circuit, the pump having a cylinder body keyed on the driving shaft and including cylinders housing said pump pistons, and the motor having a cylinder body keyed on the driven shaft, a housing enclosing the pump and fast with the motor cylinder body, a stationary housing enclosing the whole assembly, two tiltable plates coaxial with the speed transmission shafts, on one of which the free ends of the piston connecting rods of the pump bear and is pivoted on the pump enclosing housing, on the other plate, which is pivoted on the stationary housing, bear the free ends of the piston connecting rods of the motor, the motor cylinder body having a chamber formed therein at the end thereof adjacent the pump cylinder body, a ported distributor member carried by the motor cylinder body and closing the chamber, said distributor member bearing against the pump cylinder body for relative rotation thereto and serving to successively connect the pump cylinders with inner and outer portions of the chamber, the motor cylinder body having a series of cylinder ports opening into the chamber and arranged in the form of a circle concentric with the axes of said shafts, a distributor ring mounted in said chamber, means carried by the third shaft yieldably supporting said ring for rotation about an axis eccentric to said shafts to cause the ring to be positioned in said chamber with some of the motor cylinder ports opening into the portion of the chamber within said ring, with some of said cylinder ports opening into the chamber outside of said ring, and with other ports closed by said ring to various degrees, an auxiliary pump associated with the transmission and arranged to return into the hydraulic circuit the liquid which leaks through the transmission, and means to vary the degree of eccentricity of the ring in its chamber.

2. A variable speed transmission of the hydraulic type, particularly suitable for automotive devices comprising a driving shaft, a driven shaft and a third shaft coaxial with the preceding ones and stationary, said stationary shaft being mounted inside the driving shaft with its outer end inwardly of the outer end of the driving shaft, a hydraulic pump and motor of the piston type, including pistons and piston connecting rods, hydraulically interconnected in a closed circuit, the pump having a cylinder body keyed on the driving shaft and including cylinders housing said pump pistons, and the motor having a cylinder body keyed on the driven shaft, a housing enclosing the pump and fast with the motor cylinder body, a stationary housing enclosing the whole assembly, two tiltable plates coaxial with the speed transmission shafts, on one of which the free ends of the piston connecting rods of the pump bear and is pivoted on the pump enclosing housing, on the other plate, which is pivoted on the stationary housing, bear the free ends of the piston connecting rods of the motor, the motor cylinder body having a chamber formed therein at the end thereof adjacent the pump cylinder body, a ported distributor member carried by the motor cylinder body and closing the chamber, said distributor member bearing against the pump cylinder body for relative rotation thereto and serving to successively connect the pump cylinders with the inner and outer portion of the chamber, the motor cylinder body having a series of cylinder ports opening into the chamber and arranged in the form of a circle concentric with the axes of said shafts, a distributor ring mounted in said chamber, means carried by the third shaft yieldably supporting said ring for rotation about an axis eccentric to said shafts to cause the ring to be positioned in said chamber with some of the motor cylinder ports opening into the portion of the chamber within said ring, with some of said cylinder ports opening into the chamber outside of said ring, and with other ports closed by said ring to various degree, an auxiliary pump associated with the driving shaft to return into circulation the liquid which leaks from the transmission, said pump being so arranged as to keep stationary the shaft whereon the distributor ring is mounted, and means to vary the degree of eccentricity of the ring in its chamber.

3. A transmission according to claim 2 wherein the auxiliary pump arranged to keep stationary the shaft whereon the distributor ring is mounted is in the form of an eccentric roller type pump having a fixed housing having a cylindrical chamber therein eccentric to the axes of the shafts, and a cam carried by the third shaft eccentric to the third shaft but concentric with the cylindrical chamber in the housing, rollers positioned about the cam, and means carried by the driving shaft concentric therewith for rotating the rollers about the cam.

4. A transmission according to claim 2 wherein the auxiliary pump arranged to keep stationary the shaft whereon the distributor ring is mounted is in the form of a first gear pump housing carried by the driving shaft and rotatable therewith, a second gear concentrically mounted in the housing and fixed to the third shaft, a second gear concentrically mounted in the housing and fixed to a tubular control shaft, a pair of pinions fixed on a shaft eccentrically mounted in said housing and meshing respectively with said first and second gears, and means for angularly moving the control shaft to control the angular position of the third shaft.

5. A transmission according to claim 2 wherein the stationary shaft mounted inside the driving shaft carries at its free end a guide having a guideway in a plane perpendicular to the axis of said shafts, a pivot of the distributor ring being slidable in said guideway, said distributor ring being provided on the side opposite to the pivot with a roller mounted on a pin coaxial to the said pivot, a control member bearing on the said roller for the control of the transverse displacement of the said distributor ring, to vary the eccentricity of the ring, said control member being mounted on the driven shaft and selectively operable by means of a hydraulic pressure engendered inside the driven shaft.

6. A transmission according to claim 5 in which the member which controls the transverse displacement of the distributor ring comprises a piston which penetrates a cylindrical cavity inside the driven shaft and longitudinally slidable with respect thereto, a funnel-shaped extension connected to the said piston, said extension bearing with its inner surface on the periphery of the said roller to cause the transverse sliding of the distributor ring when said piston moves longitudinally inside the driven shaft under the action of a hydraulic pressure selectively engendered inside the driven shaft.

References Cited in the file of this patent

UNITED STATES PATENTS

| | | |
|---|---|---|
| 1,080,282 | Kellogg | Dec. 2, 1913 |
| 1,299,751 | Magie | Apr. 8, 1919 |
| 1,348,738 | Rayburn et al. | Aug. 3, 1920 |
| 1,726,454 | Rayburn et al. | Aug. 27, 1929 |
| 2,141,166 | Bischof | Dec. 27, 1938 |
| 2,371,974 | Neuland | Mar. 20, 1945 |
| 2,395,980 | Wahlmark | Mar. 5, 1946 |

FOREIGN PATENTS

| | | |
|---|---|---|
| 10,108 | Great Britain | Apr. 28, 1909 |